Aug. 29, 1967 G. FRANZEN 3,338,043

MULTIPLE TWIST SPINDLE

Filed Sept. 21, 1965

Inventor:
Gustav Franzen
By Cushman, Darby & Cushman
Attorneys

3,338,043
MULTIPLE TWIST SPINDLE
Gustav Franzen, Neersen, near Krefeld, Germany, assignor to Palitex Project-Company G.m.b.H., Krefeld, Germany, a company of Germany
Filed Sept. 21, 1965, Ser. No. 488,955
Claims priority, application Germany, Sept. 25, 1964, P 35,146
2 Claims. (Cl. 57—58.76)

The invention relates to a multiple twist spindle, e.g., double-twist spindle, particularly a spindle in which the bobbin carrier and the cylindrical protector are kept in place by permanent magnet means. For thus retaining the bobbin and the protector in position it is known to locate the permanent magnets at the bottom or directly adjacent the bottom of the protector. This arrangement is awkward from the point of view of keeping the height of the spindle low. With a view to providing a spindle of lower height it has been proposed to locate the permanent magnets at the top of the protector. This has the drawback that the permanent magnets are situated where the ballooning yarn begins to contract and that the diameter of the winding-off bobbin must be correspondingly less.

It is the object of the present invention to provide an arrangement of the permanent magnets which permits the overall height of the spindle to be a minimum, and which at the same time allows the use of a winding-off bobbin of the maximum diameter permitted by the spindle spacing.

It is known for the purpose of reducing the spindle spacing to displace the fixed magnets rearwardly to one side instead of locating them symmetrically in relation to the spindle. However, this generates a radial component of thrust in the bearings. The magnets should therefore be so disposed that there is no additional load on the bearings and that the spacing need nevertheless not be increased.

According to the invention this is achieved by providing the permanent magnets half way up the side of the protector facing stationary permanent magnets affixed to the machine. If desired, these latter magnets may be affixed to the balloon limiter. The permanent magnets on the protector which are radially magnetised and conformably the stationary magnets are equidistantly spaced around the circumference of the protector and conveniently contained in pockets. In order to ensure that the protector will be held in all circumstances the polarities of the magnets should be reversed from magnet to magnet.

Figure 1:
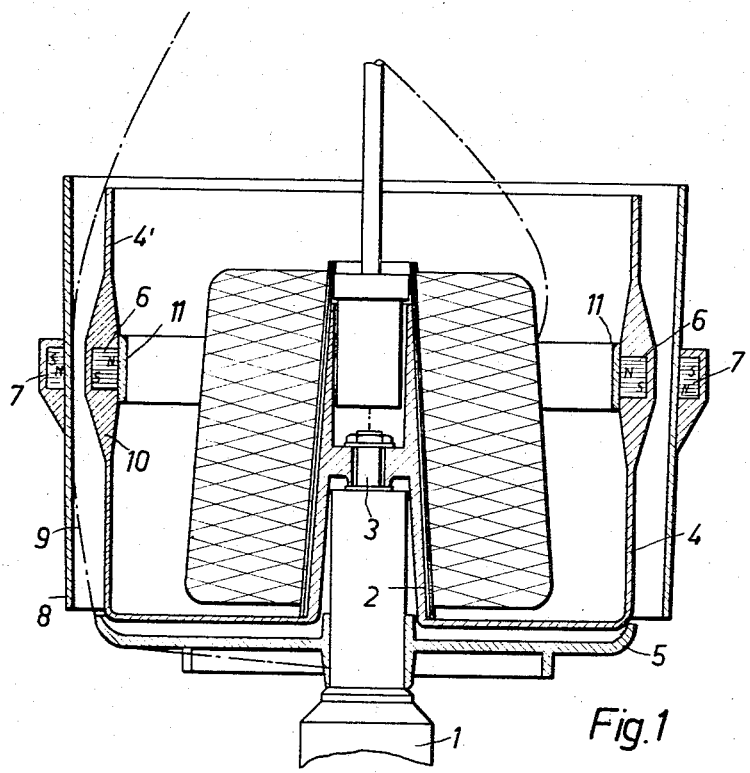
Figure 2:
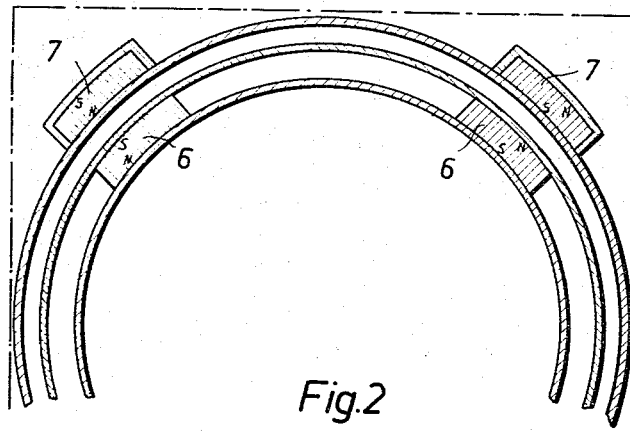

A preferred embodiment of the invention is illustratively shown in the drawing in which FIG. 1 is a vertical axial section, and
FIG. 2 is a horizontal section of the magnets.

The wharve 1 carries the bobbin carrier 2 and the hollow tube 3. The bobbin carrier 2 in conventional manner supports the cylindrical protector 4. 5 is the spindle rotor which is provided in the usual way.

In order to keep the protector 4 and hence the bobbin carrier 2 at rest, permanent magnets 6 are located halfway up the protector 4 facing permanent magnets 7 affixed to the machine frame or to the balloon limiter indicated at 8. The permanent magnets 6 are positioned where the ballooning yarn 9 expands substantially to its widest diameter. The functioning of the arrangement is not affected by the permanent magnets being slightly moved upwards or downwards.

It will be understood from FIG. 2 that four permanent magnets are equidistantly spaced around the circumference. They are magnetised in the direction of the radius of the cylindrical protector. The effective polarity of the magnets changes from magnet to magnet, as indicated by letters in the drawing. The protector is kept stationary when a north pole of one of the magnets 6 or 7 faces a south pole of the other.

FIG. 2 also shows that by providing four permanent magnets around the periphery it is possible to locate the fixed magnets at points forming an angle of 45° to the longitudinal machine axis. Consequently the stationary magnets 7 are positioned at the corners of the dash-dot square which is defined by the spindle spacing. The spindle spacing is thus most efficiently used. In other words, a bobbin of maximum diameter can be accommodated within the minimum spindle spacing. Owing to the provision of the permanent magnets half way up the protector, the overall height of the spindle is reduced to less than that of conventional arrangements.

The permanent magnets 6 may be simply inserted into pockets 10. The upper part of the protector 4 can then be mounted on the bottom part. It may also be useful to associate the permanent magnets 6 with a soft iron ring 11 to provide a magnetic return. This ring can then be affixed to the inside of the protector.

What I claim is:
1. In combination: a yarn-ballooning multiple twist spindle and a frame; said spindle comprising: a bobbin carrier and means defining a cylindrical protector wall arranged to surround a bobbin carried by said bobbin carrier; the protector wall, at the approximate level of the maximum radial spread of the ballooning yarn having a radially outwardly projecting zone of increased radial thickness; means defining a pocket in said zone of increased radial thickness; at least one radially magnetized permanent magnet mounted on said protector wall in said pocket substantially at the approximate level of the maximum radial spread of the ballooning yarn, said frame including stationary wall means circumferentially surrounding said protector wall, at least one radially magnetized stationary permanent magnet mounted on said stationary wall means outside the ballooning yarn and being positioned for facing conformable radial adjacency with the first mentioned permanent magnet on said protector wall.

2. In combination: a yarn ballooning multiple twist spindle and a frame; said spindle comprising: a bobbin carrier and means defining a cylindrical protector arranged to surround a bobbin carried by said bobbin carrier; the protector wall, at the appoximate level of the maximum radial spread of the ballooning yarn having a radially outwardly projecting zone of increased radial thickness; means defining a plurality of angularly spaced pockets in said zone of increased radial thickness; a plurality of radially magnetized permanent magnets mounted on said protector wall approximately half-way up the protector wall each in respective of said pockets substantially at the level of the maximum radial spread of the ballooning yarn, said permanent magnets being equidistantly disposed from one another about the periphery of said protector wall; said frame including: stationary wall means circumferentially surrounding said protector wall, and a plurality of radially magnetized stationary permanent magnets mounted equi-distant from one another on said surrounding means, said stationary permanent magnets being at the level of and being positioned for conformable radial adjacency with respective of said permanent magnets on said protector wall; said stationary permanent magnets being four in number and each being so located along radii of said spindle as to form 45 degree horizontal angles with the horizontal longitudinal axis of the frame.

References Cited

UNITED STATES PATENTS

| | | | |
|---|---|---|---|
| 2,445,721 | 7/1948 | Bartholomew | 57—58.76 |
| 2,473,521 | 6/1949 | Gwaltney | 57—58.76 |
| 2,563,641 | 8/1951 | Colombu et al. | 57—58.76 X |
| 2,664,694 | 1/1954 | Gannon et al. | 57—58.76 X |
| 2,671,305 | 3/1954 | Klein | 57—58.76 X |
| 2,684,566 | 7/1954 | Roberts | 57—58.76 |
| 2,732,681 | 1/1956 | Klein | 57—58.76 X |
| 2,924,064 | 2/1960 | Hedtmann et al. | 57—58.76 |
| 3,177,643 | 4/1965 | Halleux et al. | 57—58.83 X |

FOREIGN PATENTS

| | | |
|---|---|---|
| 893,699 | 4/1962 | Great Britain. |
| 999,420 | 1/1952 | France. |
| 1,084,943 | 1/1955 | France. |
| 1,310,757 | 10/1962 | France. |

FRANK J. COHEN, *Primary Examiner.*

D. E. WATKINS, *Assistant Examiner.*